(12) United States Patent
Balasubramanian et al.

(10) Patent No.: US 10,825,143 B2
(45) Date of Patent: Nov. 3, 2020

(54) AUTO-ROTATING CONTROLLER DISPLAY AND METHODS OF DETERMINING CONTROLLER DISPLAY ORIENTATION FOR CARGO HANDLING SYSTEMS

(71) Applicant: GOODRICH CORPORATION, Charlotte, NC (US)

(72) Inventors: Rameshkumar Balasubramanian, Bangalore (IN); Sudhendra Nayak, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/436,492

(22) Filed: Jun. 10, 2019

(65) Prior Publication Data
US 2020/0311873 A1    Oct. 1, 2020

(30) Foreign Application Priority Data

Mar. 25, 2019    (IN) .............................. 201941011520

(51) Int. Cl.
| | | |
|---|---|---|
| G09G 5/00 | (2006.01) | |
| G06T 3/60 | (2006.01) | |
| G06T 7/70 | (2017.01) | |
| G06K 7/14 | (2006.01) | |
| G06K 7/10 | (2006.01) | |
| G01C 23/00 | (2006.01) | |

(52) U.S. Cl.
CPC .............. *G06T 3/60* (2013.01); *G01C 23/00* (2013.01); *G06K 7/10722* (2013.01); *G06K 7/1413* (2013.01); *G06K 7/1417* (2013.01); *G06T 7/70* (2017.01); *G06T 2207/30244* (2013.01)

(58) Field of Classification Search
CPC .... G09G 2340/0492; G06F 2200/1614; G06F 1/1626; G06F 1/1684; G06F 1/1601
USPC ........................................................ 345/659
See application file for complete search history.

(56) References Cited

U.S. PATENT DOCUMENTS

| | | |
|---|---|---|
| 9,736,434 B2 | 8/2017 | Larsen et al. |
| 2010/0213313 A1* | 8/2010 | Reed ...................... G06Q 10/08 |
| | | 244/118.1 |
| 2015/0241961 A1 | 8/2015 | Morris et al. |
| 2015/0375851 A1* | 12/2015 | Salesse-Lavergne ....................... |
| | | B64C 13/18 |
| | | 244/17.13 |
| 2017/0213062 A1* | 7/2017 | Jones ................... G06K 9/0063 |
| 2017/0345399 A1 | 11/2017 | Lee et al. |

(Continued)

OTHER PUBLICATIONS

European Patent Office, European Search Report dated Jul. 9, 2020 in Application No. 19216266.7.

*Primary Examiner* — Gordon G Liu
(74) *Attorney, Agent, or Firm* — Snell & Wilmer L.L.P.

(57) ABSTRACT

An article of manufacture may include a tangible, non-transitory computer-readable storage medium having instructions stored thereon for orienting a display of a portable electronic device configured to control a cargo handling system. The instructions, in response to execution by a processor, cause the processor to perform operations which may comprise identifying an optical label scanned by a camera of the portable electronic device, determining a viewing angle of the camera relative to the optical label, and determining an orientation of the display of the portable electronic device based on the viewing angle of the camera relative to the optical label.

15 Claims, 12 Drawing Sheets

(56) References Cited

U.S. PATENT DOCUMENTS

2018/0089611 A1    3/2018    Burch, V et al.

* cited by examiner

AUTO-ROTATING CONTROLLER DISPLAY AND METHODS OF DETERMINING CONTROLLER DISPLAY ORIENTATION FOR CARGO HANDLING SYSTEMS

CROSS REFERENCE TO RELATED APPLICATIONS

This application claims priority to and the benefit of India Patent Application No. 201941011520 titled, "AUTO-ROTATING CONTROLLER DISPLAY AND METHODS OF DETERMINING CONTROLLER DISPLAY ORIENTATION FOR CARGO HANDLING SYSTEMS" and filed Mar. 25, 2019. All of the contents of the previously identified application are hereby incorporated by reference for any purpose in their entirety

FIELD

The present disclosure relates to cargo handling systems, and more specifically, to an auto-rotating controller display and methods of determining controller display orientation for cargo handling systems.

BACKGROUND

Cargo handling systems move loads, for example, pallets or unit load devices (ULDs), through the cargo area of an aircraft using motorized wheels (e.g., power drive units (PDUs) and freighter common turntables (FCTs)) located generally along on a cargo deck of the aircraft. The movement of ULDs is generally controlled by an operator using various control panels, for example using a master control panel (MCP), an outside control panel (OCP), and/or local control panels (LCPs).

Portable electronic devices (PEDs), such as tablet computing devices, enable implementation of control panels and cargo maintenance display units (CMDUs) functionalities into the PED. The portability of PEDs enables the operator to freely carry the PED (and thus the control panel display) into the cargo area. As the operator moves through the aircraft, the orientation of the PED display may not update and/or change to the actual heading of the aircraft. Movement of ULDs is relative to the aircraft heading direction. Thus, failure of the PED display to update the heading of the aircraft to the direction of viewing of the operator can confuse the operator as to which direction the ULD should be driven and/or as which PDUs should be activated.

SUMMARY

A portable electronic device for controlling a cargo handling system is disclosed herein. In accordance with various embodiments, the portable electronic device may comprise a display, a camera, a processor in electronic communication with the camera and the display; and a tangible, non-transitory memory configured to communicate with the processor. The tangible, non-transitory memory may have instructions stored thereon that, in response to execution by the processor, cause the processor to perform operations comprising: identifying, by the processor, an optical label scanned by the camera, determining, by the processor, a viewing angle of the camera relative to the optical label, and determining, by the processor, an orientation of the display based on the viewing angle of the camera relative to the optical label.

In various embodiments, the operations may further comprise determining, by the processor, an aircraft heading. In various embodiments, determining the aircraft heading may comprise determining, by the processor, a heading of the portable electronic device relative to magnetic north, and calculating, by the processor, the aircraft heading using the heading of the portable electronic device and the viewing angle of the camera relative to the optical label.

In various embodiments, determining the orientation of the display may comprise calculating, by the processor, a portable electronic device orientation relative to the aircraft heading and comparing, by the processor, the portable electronic device orientation to an orientation limit angle. In various embodiments, determining the orientation of the display may further comprise orienting, by the processor, a location of a cargo system component on the display to coincide with an orientation of the portable electronic device.

In various embodiments, identifying the optical label scanned by the camera may comprise determining, by the processor, if the optical label is a right optical label or a left optical label. In various embodiments, the viewing angle of the camera relative to the optical label may be measured between a viewing axis of the camera and an axis perpendicular to a scannable surface of the optical label.

A method for orienting a display of a portable electronic device configured to control a cargo handling system is also disclosed herein. In accordance with various embodiments, the method may comprise the steps of identifying, by a processor, an optical label scanned by a camera, determining, by the processor, a viewing angle of the camera relative to the optical label, and determining, by the processor, an orientation of a display screen based on the viewing angle of the camera relative to the optical label.

In various embodiments, the method may further comprise determining, by the processor, an aircraft heading. In various embodiments, determining the aircraft heading may comprise determining, by the processor, a heading of the portable electronic device relative to magnetic north and calculating, by the processor, the aircraft heading using the heading of the portable electronic device and the viewing angle of the camera relative to the optical label.

In various embodiments, determining the orientation of the display may comprise calculating, by the processor, a portable electronic device orientation relative to the aircraft heading and comparing, by the processor, the portable electronic device orientation to an orientation limit angle. In various embodiments, determining the orientation of the display may further comprise orienting, by the processor, a location of a cargo system component on the display to coincide with an orientation of the portable electronic device.

In various embodiments, identifying the optical label scanned by the camera may comprise determining, by the processor, if the optical label is a right optical label or a left optical label. In various embodiments, the viewing angle of the camera relative to the optical label may be measured between a viewing axis of the camera and an axis perpendicular to a scannable surface of the optical label.

An article of manufacture is also disclosed herein. In accordance with various embodiments, the article of manufacture may include a tangible, non-transitory computer-readable storage medium having instructions stored thereon for orienting a display of a portable electronic device configured to control a cargo handling system. The instructions, in response to execution by a processor, cause the processor to perform operations, which may comprise: identifying, by the processor, an optical label scanned by a camera of the portable electronic device, determining, by the processor, a viewing angle of the camera relative to the optical label, and determining, by the processor, an orientation of the display of the portable electronic device based on the viewing angle of the camera relative to the optical label.

In various embodiments, the operations may further comprise determining, by the processor, an aircraft heading. In various embodiments, determining the aircraft heading may comprise determining, by the processor, a heading of the portable electronic device relative to magnetic north and calculating, by the processor, the aircraft heading using the heading of the portable electronic device and the viewing angle of the camera relative to the optical label.

In various embodiments, determining the orientation of the display may comprise calculating, by the processor, a portable electronic device orientation relative to the aircraft heading and comparing, by the processor, the portable electronic device orientation to an orientation limit angle.

In various embodiments, determining the orientation of the display may further comprise orienting, by the processor, a location of a cargo system component on the display to coincide with an orientation of the portable electronic device. In various embodiments, identifying the optical label scanned by the camera may comprise determining, by the processor, if the optical label is a right optical label or a left optical label.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like numbers denote to like elements.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion. As used herein, "proximate"

refers to a direction toward, or a location generally closer to a reference component. As used herein, "longitudinal" refers to a forward to aft direction.

Figure 1A:
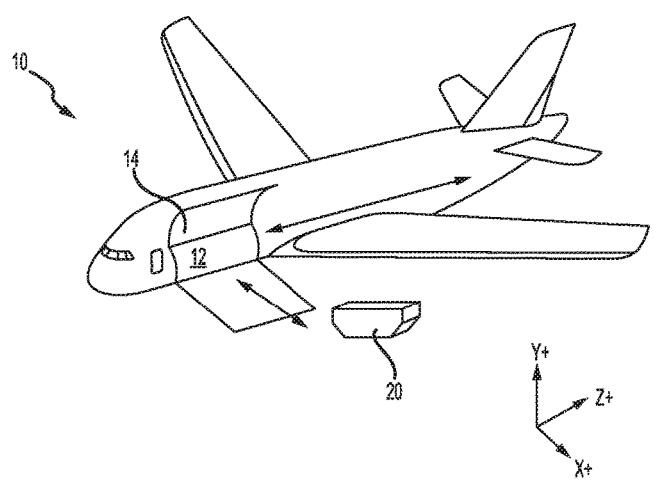
FIG. 1A illustrates a schematic view of an aircraft being loaded with cargo, in accordance with various embodiments.

In accordance with various embodiments, and with reference to FIG. 1A, an aircraft 10 having a cargo deck 12 is illustrated. Aircraft 10 may comprise a cargo load door 14. Cargo 20 may be loaded through cargo load door 14 and onto cargo deck 12. Items to be shipped by air, freight, and/or the like are typically loaded first onto specially configured pallets or into specially configured containers. In aviation, those various pallets and/or containers are commonly are referred to as unit load devices (ULDs). In various embodiments, cargo 20 may be a ULD. Once inside aircraft 10, the cargo 20 is moved along cargo deck 12 to its final stowage position. Multiple pieces of cargo may be brought on-board aircraft 10, during one or more loading procedures (e.g., at separate destinations), with each piece of cargo being placed in its respective stowage and transportation position on cargo deck 12. After aircraft 10 has reached its destination, cargo 20 may be unloaded from aircraft 10 similarly, but in reverse sequence to the loading procedure.

Figure 1B:
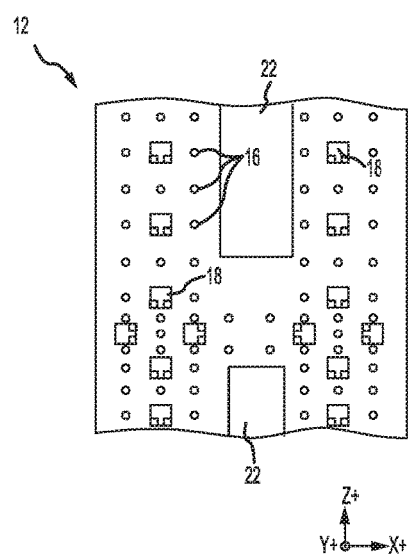
FIG. 1B illustrates a portion of an aircraft cargo deck, in accordance with various embodiments.

In accordance with various embodiments, and with reference to FIG. 1B, cargo deck 12 is illustrated in greater detail. The cargo deck 12 may be defined by inner walls of aircraft 10. Cargo deck 12 may include a plurality of freely rotating conveyance rollers 16 and a number of power drive units (PDUs) 18 mounted in cargo deck 12. PDUs 18 may be configured to propel cargo over conveyance rollers 16 and across cargo deck 12. In various embodiments, cargo deck 12 may include one or more freighter common turntables (FCTs) 22 configured to translate cargo across cargo deck 12.

Figure 2:
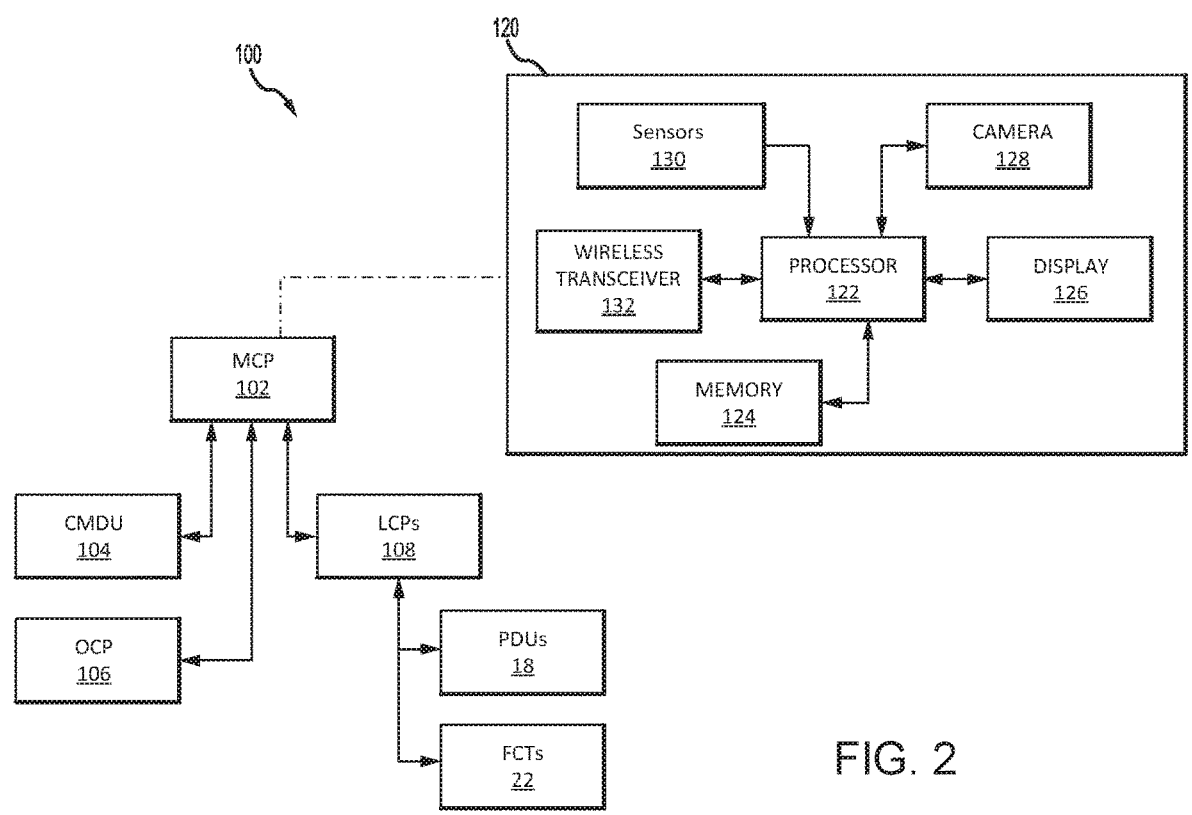
FIG. 2 illustrates a schematic block diagram of a cargo handling system having a PED with an auto-rotating controller display, in accordance with various embodiments.

Referring to FIG. 2, and with continued reference to FIG. 1A, to facilitate movement of cargo 20 along cargo deck 12, aircraft 10 may include a cargo handling system 100. Cargo handling system 100 may be configured to control and monitor the cargo loading and unloading processes. Cargo handling system 100 may comprise a master control panel (MCP) 102. MCP 102 may be in operable communication, via wired or wireless connection, with a cargo maintenance display unit (CMDU) 104 and an outside control panel (OCP) 106. CMDU 104 may be configured to track and display the health or operating condition of various components (e.g. PDUs 18) of cargo handling system 100. OCP 106 may provide an interface or means for controlling cargo handling system 100 remotely (e.g., from the cockpit of aircraft 10, from a main cargo handling office, or any other location from which cargo deck 12 may not be readily in view). MCP 102 may be in operable communication, via wired or wireless connection, with one or more local control panels (LCPs) 108. LCPs 108 may be configured to control PDUs 18 and/or FCTs 22. For example, an operator may use LCPs 108 to send command signals, via wired or wireless connection, to PDUs 18 and FCTs 22 to control the movement of cargo 20 over cargo deck 12.

In accordance with various embodiments, cargo handling system 100 includes a portable electronic device (PED) 120. PED 120 includes a processor 122, a memory 124, a user interface 126 (also referred to herein as a display), a camera 128, sensors 130 (e.g., magnetometer, compasses, accelerometers, barometer, etc.), and a wireless transceiver 132. PED 120 is configured to interact and wirelessly communicate with MCP 102. PED 120 comprises one or more of a computer, microcontroller, microprocessor, and/or other control logic.

In various embodiments, memory 124 is configured to store information used in running PED 120. In various embodiments, memory 124 comprises a computer-readable storage medium, which, in various embodiments, includes a non-transitory storage medium. In various embodiments, the term "non-transitory" indicates that the memory 124 is not embodied in a carrier wave or a propagated signal. In various embodiments, the non-transitory storage medium stores data that, over time, changes (e.g., such as in a random access memory (RAM) or a cache memory). In various embodiments, memory 124 comprises a temporary memory. In various embodiments, memory 124 comprises a volatile memory. In various embodiments, the volatile memory includes one or more of RAM, dynamic RAM (DRAM), static RAM (SRAM), and/or other forms of volatile memories. In various embodiments, memory 124 is configured to store computer program instructions for execution by processor 122. In various embodiments, applications and/or software running on PED 120 utilize(s) memory 124 in order to temporarily store information used during program execution. In various embodiments, memory 124 includes one or more computer-readable storage media. In various embodiments, memory 124 is configured to store larger amounts of information than volatile memory. In various embodiments, memory 124 is configured for longer-term storage of information. In various embodiments, memory 124 includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, processor 122 is configured to implement functionality and/or process instructions. In various embodiments, processor 122 is configured to process computer instructions stored in memory 124. In various embodiments, processor 122 includes one or more of a microprocessor, a controller, a digital signal processor (DSP), an application specific integrated circuit (ASIC), a field-programmable gate array (FPGA), or other equivalent discrete or integrated logic circuitry. In various embodiments, display 126 comprises one or more of a screen, touchscreen, or any other suitable interface device(s) that is configured to allow a user to interact and control cargo handling system 100, for example, send command signals to camera 128, PDUs 18, and FCTs 22.

System program instructions and/or processor instructions may be loaded onto memory 124. The system program instructions and/or processor instructions may, in response to execution by operator, cause processor 122 to perform various operations. In particular, and as described in further detail below, the instructions may allow processor 122 to determine an aircraft heading and a heading of PED 120 and orient display 126 in accordance with that determination. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 3A:
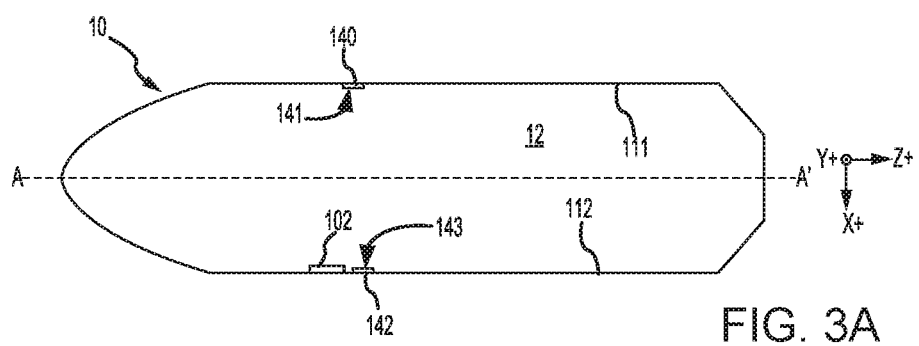
FIGS. 3A and 3B illustrate a plan view and a perspective view, respectively, of cargo deck 12, in accordance with various embodiments.
Figure 3B:
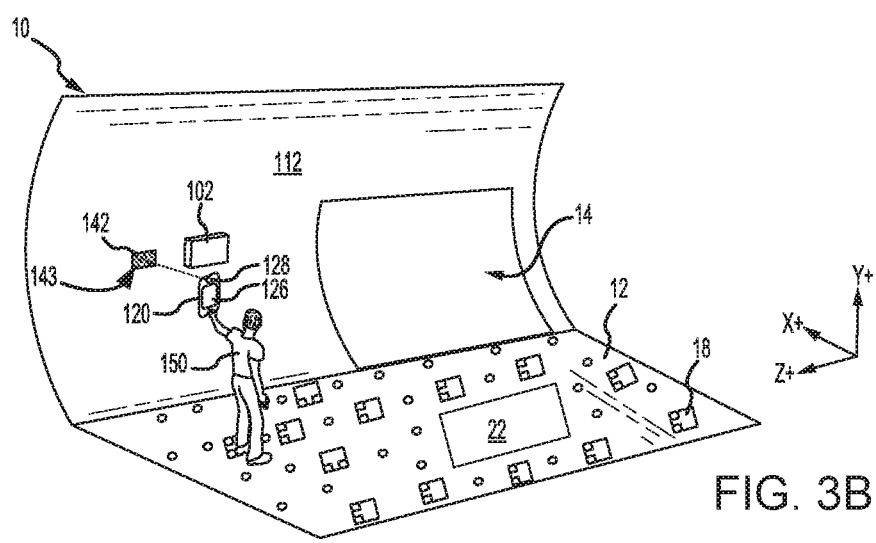

FIG. 3A illustrates a plan view of cargo deck 12, in accordance with various embodiments. FIG. 3B illustrates a perspective view of a portion of cargo deck 12, in accordance with various embodiments. With combined reference to FIGS. 3A and 3B, a right (or first) machine-readable optical label 140 may be attached to a right (or first) wall 111 of aircraft 10. A left (or second) machine-readable optical label 142 may be attached to a left (or second) wall 112 of aircraft 10. As used herein, the terms "left" or "left-facing" and "right" or "right-facing" are determined from the perspective of person looking in the forward direction. In this regard, the aft direction is illustrated as the positive z-direction on the provided x-y-z axis, the forward direction is illustrated as the negative z-direction on the provided x-y-z axis, "left" is illustrated as the positive x-direction on the provided x-y-z axis, and "right" is illustrated as the negative x-direction on the provided x-y-z axis.

Optical labels 140, 142 may comprise a one dimension barcode, two dimension barcode, or other scannable identification tag. Right optical label 140 is attached to right wall 111 such that a scannable surface 141 of right optical label 140 is parallel to aircraft longitudinal axis A-A'. Left optical label 142 is attached to left wall 112 such that a scannable surface 143 of left optical label 142 is parallel to aircraft longitudinal axis A-A'. PED 120 is configured to scan and recognize right and left optical labels 140, 142. For example, prior to a new loading event, operator 150 may scan either right optical label 140 or left optical label 142 using camera 128 of PED 120. While FIG. 3A shows one right optical label 140 and one left optical label 142, it is further contemplate and understood that multiple right optical labels may be located on right wall 111 and/or multiple left optical label may be located on left wall 112 with the scannable surface of each left and right optical label oriented parallel to aircraft longitudinal axis A-A'. The location of the optical labels may be selected such that at least one optical label is accessible when cargo (e.g., cargo 20 in FIG. 1A) is present in cargo deck 12.

With combined reference to FIG. 2 and FIG. 3B, and as discussed in further detail below, processor 122 of PED 120 may be configured to compute a heading of aircraft 10 relative to magnetic north using a viewing angle of camera 128 relative to the scanned optical label. Processor 122 may then determine an orientation for display 126 of PED 120 using the aircraft heading and a heading of PED 120 relative to magnetic north.

Figure 4A:
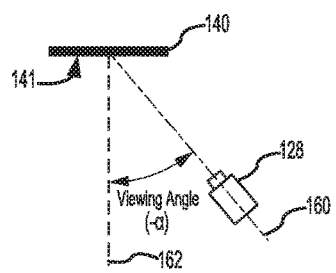
FIGS. 4A, 4B, and 4C illustrate various viewing angles of a PED camera relative to a right optical label, in accordance with various embodiments.
Figure 4B:
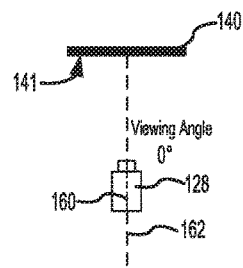
Figure 4C:
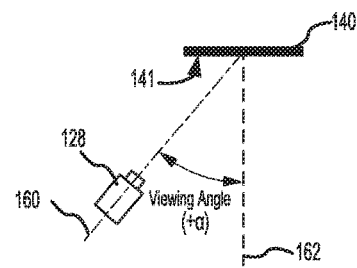

With reference to FIGS. 4A, 4B, and 4C various viewing angles ($\alpha$) of camera 128 are illustrated relative to right optical label 140, in accordance with various embodiments. Viewing angle ($\alpha$) is measured between an imaginary PED camera viewing axis 160 and an imaginary axis 162 that is perpendicular to scannable surface 141 of right optical label 140. Stated differently, viewing angle ($\alpha$) is calculated relative to an axis that is perpendicular to aircraft longitudinal axis A-A', with momentary reference to FIG. 3A. Viewing angle ($\alpha$) of camera 128 may be measured using computer vision techniques, for example, using 2D perspective/warp transformation or similar image/video processing techniques. Viewing angle ($\alpha$) may be measured as a negative angle ($-\alpha$), when camera 128 is positioned aft of axis 162. In this regard, viewing angle ($\alpha$) is between $0°$ and $-90°$ when camera 128 is positioned aft of axis 162. Viewing angle ($\alpha$) may be measured as a positive angle ($+\alpha$), when camera 128 is positioned forward of axis 162. In this regard, viewing angle ($\alpha$) is between $0°$ and $+90°$ when camera 128 is positioned forward of axis 162. Viewing angle ($\alpha$) is $0°$ is when camera 128 is positioned parallel to axis 162. Thus, the viewing angle ranges between $+90°$ and $-90°$ depending on the viewing direction of camera 128.

Figure 4D:
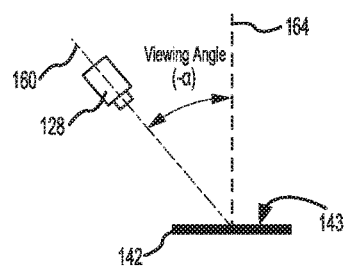
FIGS. 4D, 4E, and 4F illustrate various viewing angles of a PED camera relative to a left optical label, in accordance with various embodiments.
Figure 4E:
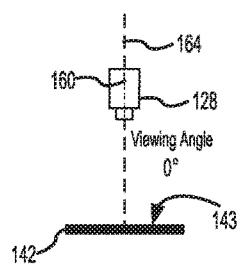
Figure 4F:
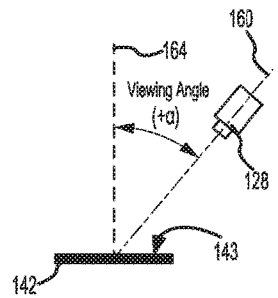

With reference to FIGS. 4D, 4E, and 4F various viewing angles ($\alpha$) of camera 128 are illustrated relative to left optical label 142, in accordance with various embodiments. Viewing angle ($\alpha$) is measured between an imaginary PED camera viewing axis 160 and an imaginary axis 164 that is perpendicular to scannable surface 143 of left optical label 142. Stated differently, viewing angle ($\alpha$) is calculated relative to an axis that is perpendicular to aircraft longitudinal axis A-A', with momentary reference to FIG. 3A. Viewing angle ($\alpha$) may be measured as a negative angle ($-\alpha$), when camera 128 is positioned forward of axis 164. In this regard, viewing angle ($\alpha$) is between $0°$ and $-90°$ when camera 128 is positioned forward of axis 162. Viewing angle ($\alpha$) may be measured as a positive angle ($+\alpha$), when camera 128 is positioned aft of axis 164. In this regard, viewing angle ($\alpha$) is between $0°$ and $+90°$ when camera 128 is positioned aft of axis 164. Viewing angle ($\alpha$) is $0°$ is when camera 128 is positioned parallel to axis 164. Thus, the viewing angle ranges between $+90°$ and $-90°$ depending on the viewing direction of camera 128.

Figure 5A:
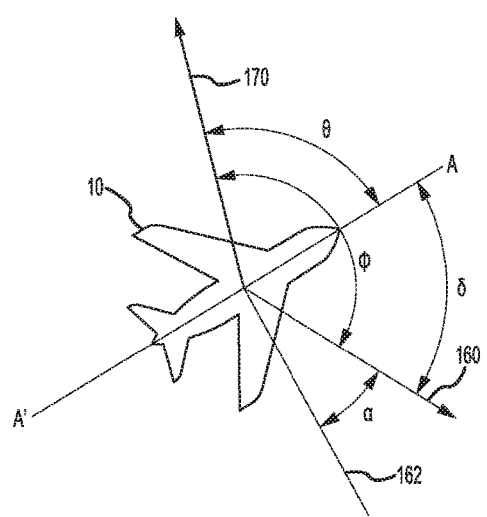
FIG. 5A illustrates various PED angles and aircraft heading angles relative to a right optical label, in accordance with various embodiments.

FIG. 5A illustrates various angles that may be calculated based on viewing angle ($\alpha$) relative to axis 162 of right optical label 140. Viewing angle ($\alpha$) is measured relative to viewing axis 160 and axis 162. A PED heading angle ($\phi$) may be measured between viewing axis 160 and magnetic north 170. An aircraft heading angle ($\theta$) may be measured between magnetic north 170 and aircraft longitudinal axis A-A'. A PED heading angle relative to the aircraft heading ($\delta$) (referred to herein as PED orientation angle ($\delta$)) may be measured between viewing axis 160 and aircraft longitudinal axis A-A'.

Figure 5B:
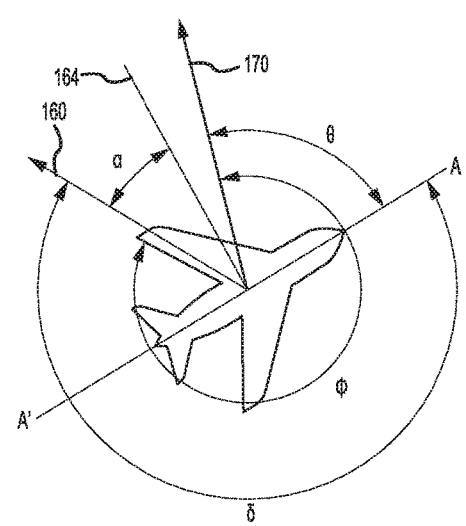
FIG. 5B illustrates various PED angles and aircraft heading angles relative to a left optical label, in accordance with various embodiments.

FIG. 5B various angles that may be calculated based on viewing angle ($\alpha$) relative to axis 164 of left optical label 142. Viewing angle ($\alpha$) is measured relative to viewing axis 160 and axis 164. PED heading angle ($\phi$) may be measured between viewing axis 160 and magnetic north 170. Aircraft heading angle ($\theta$) may be measured between magnetic north 170 and aircraft longitudinal axis A-A'. PED heading relative to aircraft heading angle ($\delta$) may be measured between viewing axis 160 and aircraft longitudinal axis A-A'.

Figure 6A:
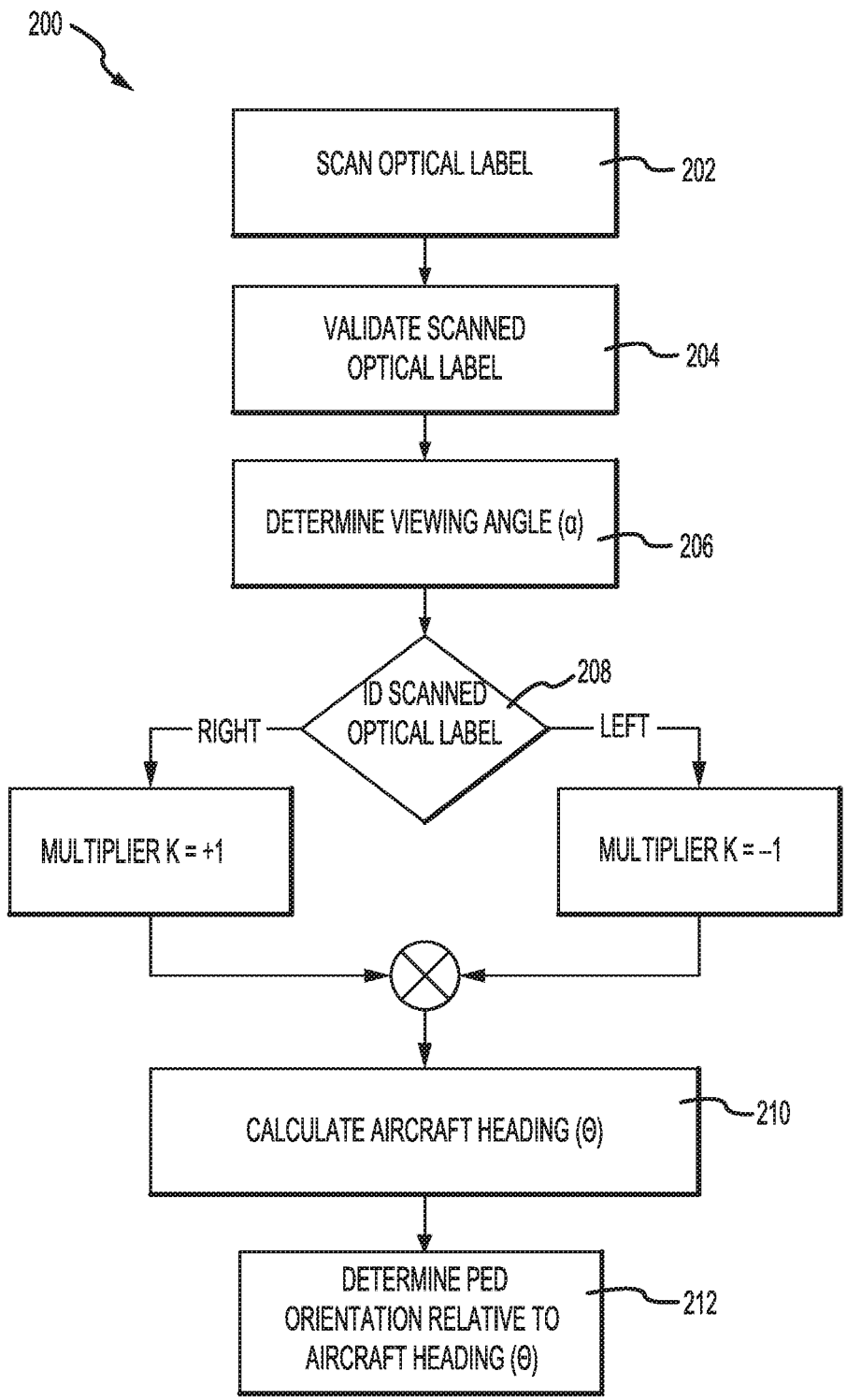
FIGS. 6A and 6B illustrate a method of determining an aircraft heading and a PED orientation based on a viewing angle of a PED camera relative to an optical label, in accordance with various embodiments.

FIG. 6A illustrates a flow diagram for a method 200 of computing aircraft heading angle ($\theta$) and determining PED display orientation using the viewing angle ($\alpha$) of camera 128 relative to right optical label 140 or left optical label 142, in accordance with various embodiments. Method 200 may include scanning an optical label located on an interior wall of the cargo deck (step 202). In various embodiments, step 202 includes scanning a right optical label 140 or a left optical label 142 using camera 128 of PED 120. Method 200 may further include validating the scanned optical label (step 204). Step 204 may comprise processor 122 determining the scanned optical label contains cargo system PED orientation information. For example, processor 122 may determine the optical label is a PED orientation label as opposed to, for example, a ULD identification label.

Method 200 further includes determining a viewing angle ($\alpha$) of the PED camera (step 206). Step 206 may comprise processor 122 determining viewing angle ($\alpha$) of camera 128 relative to an axis perpendicular to a scannable surface of the optical label (i.e., to an axis perpendicular to the aircraft longitudinal axis). Method 200 further includes determining if the scanned optical label is a right or left optical label (step 208). In various embodiments, step 208 may include processor 122 determining whether the scanned optical label is a left or right.

Figure 6B:
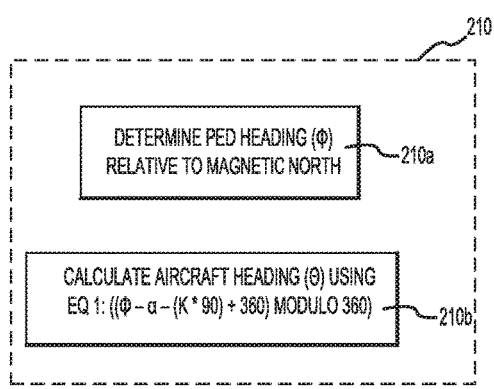

Method 200 further includes calculating an aircraft heading ($\theta$) relative to magnetic north using the viewing angle ($\alpha$) (step 210). In various embodiments, and with reference to FIG. 6B, step 210 includes processor 122 measuring a PED heading (φ) relative to magnetic north (step 210a) and calculating aircraft heading (θ) using equation 1 below (step 210b).

$$\theta = ((\phi - \alpha - (K*90) + 360) \text{MODULO } 360) \qquad \text{EQ. 1}$$

where θ is the angle of aircraft longitudinal axis A-A' relative to magnetic north; φ is the angle of the viewing axis of the camera (e.g., viewing axis 160 in FIG. 4A) relative to magnetic north; and α is the angle of viewing axis of the camera (e.g., viewing axis 160 in FIG. 4A) relative to the axis of the optical label (e.g., axis 162 in FIG. 4A). In various embodiments, processor 122 may determine PED heading (φ)) using sensors 130, for example, magnetometer and/or compasses, of PED 120.

Returning to FIG. 6A, method 200 further includes orienting the PED display using aircraft heading (θ) (step 212). Step 212 may include processor 122 computing an orientation of display 126 of PED 120 based on the orientation of PED 120 relative to aircraft heading (θ).

Figure 7A:
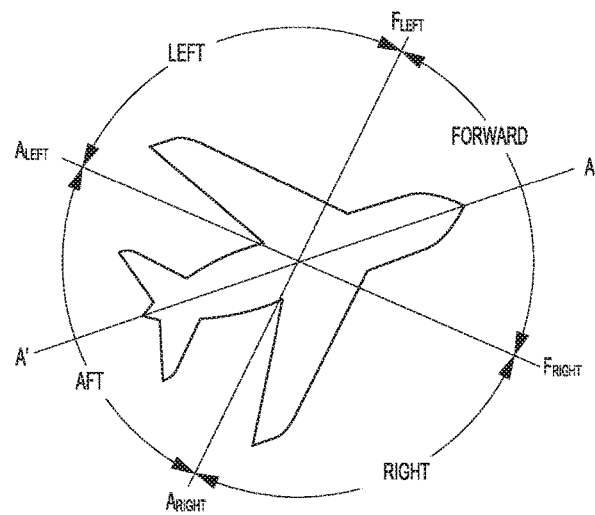
FIG. 7A illustrates various PED display orientations, in accordance with various embodiments.

FIG. 7A illustrates various PED display orientations and orientation boundaries, in accordance with various embodiments. In FIG. 7A, forward right limit ($F_{Right}$), forward left limit ($F_{Left}$), aft right limit ($A_{Right}$), and aft left limit ($A_{Left}$) illustrate orientation limit angles defining the various PED display orientations. A forward-facing display orientation is located between forward left limit ($F_{Left}$) and forward right limit ($F_{Right}$). A right-facing display orientation is between forward right limit ($F_{Right}$) and aft right limit ($A_{Right}$). An aft-facing orientation is between aft right limit ($A_{Right}$) and aft left limit ($A_{Left}$). A left-facing orientation is between aft left limit ($A_{Left}$) and forward left limit ($F_{Left}$). In various embodiments, forward right limit ($F_{Right}$), forward left limit ($F_{Left}$), aft right limit ($A_{Right}$), and aft left limit ($A_{Left}$) may be spaced approximately 90° apart from one another. As used in the previous context, "approximately" means ±2°. For example, in various embodiments, forward left limit ($F_{Left}$) may be approximately 315° as measured from aircraft longitudinal axis A-A', forward right limit ($F_{Right}$) may be approximately 45° as measured from aircraft longitudinal axis A-A', aft right limit ($A_{Right}$) may be approximately 135° as measured from aircraft longitudinal axis A-A', and aft left limit ($A_{Left}$) may be approximately 225° as measured from aircraft longitudinal axis A-A'. As used in the previous context, "approximately" means ±2°. The disclosed orientation limit angles are exemplary. In various embodiments, the orientation limit angles may be selected (i.e., are configurable) using an input file stored in memory 124 of the PED 120.

Figure 7B:
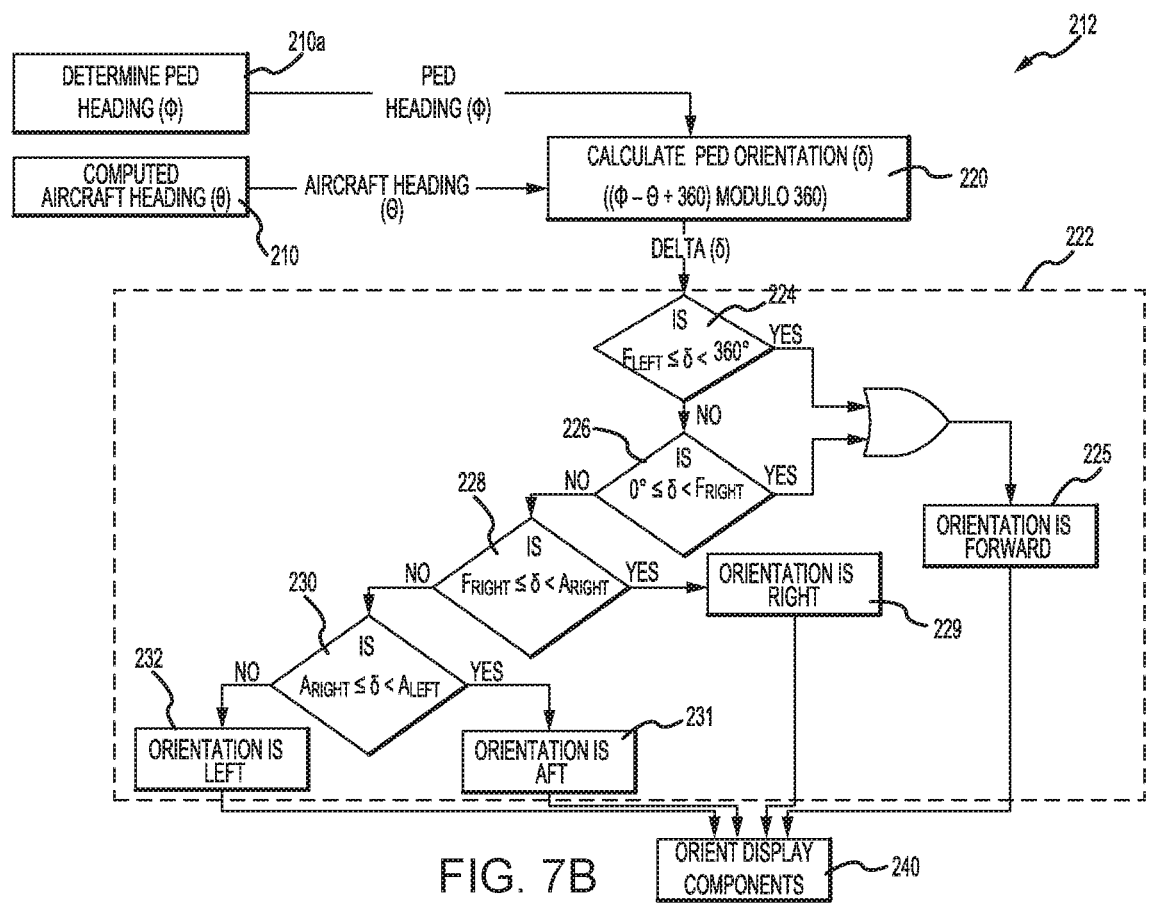
FIG. 7B illustrates a process flow for determining a PED display orientation, in accordance with various embodiments.

Referring to FIG. 7B, a flow diagram for determining the PED display orientation (step 212) with respect to the aircraft heading is illustrated, in accordance with various embodiments. Step 212 may include calculating a PED orientation (δ) (step 220). PED orientation (δ) is the angle of the PED relative to the aircraft heading (θ). In this regard, as an operator changes the orientation of PED 120 (e.g., pivots camera 128 from an aft-facing direction to a left-facing direction) PED orientation (δ) changes. In various embodiments, PED orientation (δ) may be measured between viewing axis 160 of camera 128 and aircraft longitudinal axis A-A'. In various embodiments, processor 122 may calculate PED orientation (δ) using PED heading (φ)) and aircraft heading (θ). Processor 122 may calculate PED orientation (δ) using equation 2.

$$\delta = ((\phi - \theta + 360) \text{MODULO } 360) \qquad \text{EQ. 2}$$

where δ is the angle of viewing axis 160 of camera 128 relative to aircraft longitudinal axis A-A' aircraft; θ is the angle of aircraft longitudinal axis A-A' relative to magnetic north 170; and φ is the angle of the viewing axis of the camera (e.g., viewing axis 160 in FIG. 4A) relative to magnetic north 170. Processor 122 may determine PED heading (φ)) using sensors 130, for example, a magnetometer and/or compass, of PED 120.

Step 212 further includes comparing PED orientation (δ) to one or more orientation limit angle(s) (also referred to as threshold angles) to determine the orientation of the PED display (step 222). In various embodiments, processor 122 may determine if PED orientation (δ) is greater than or equal to forward left limit $F_{Left}$ (e.g., 315°) and less than 360°. If PED orientation (δ) is greater than or equal to forward left limit $F_{Left}$ and less than 360°, processor 122 determines PED 120 is oriented in a forward-facing direction (step 225) and orients cargo system components on display 126 to a forward-facing orientation (step 240). Stated differently, in step 240 processor 122 orients the cargo system components displayed on display 126 of PED 120 to coincide with the orientation of PED 120.

If processor 122 determines PED orientation (δ) is not greater than or equal to forward left limit $F_{Left}$ (e.g., 315°) and not less than 360°, processor 122 may determine if PED orientation (δ) is greater than or equal to 0° and less than forward right limit $F_{Right}$ (e.g., 45°) (step 226). If PED orientation (δ) is greater than or equal to 0° and less than forward right limit $F_{Right}$, processor 122 determines PED 120 is oriented in a forward-facing direction (step 225) and orients various cargo system components on display 126 to a forward-facing orientation (step 240).

Figure 8A:
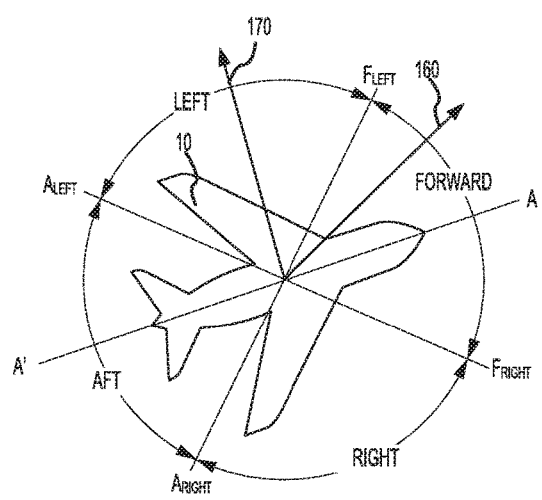
FIG. 8A illustrates a PED oriented in a forward direction, in accordance with various embodiments.
Figure 8B:
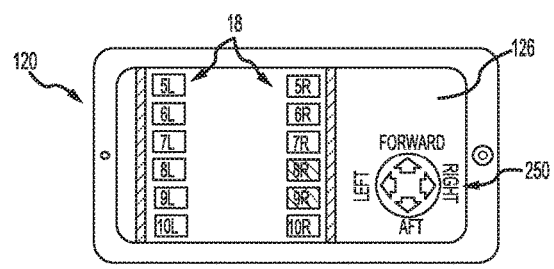
FIGS. 8B and 8C illustrate a display of a forward oriented PED, in accordance with various embodiments.
Figure 8C:
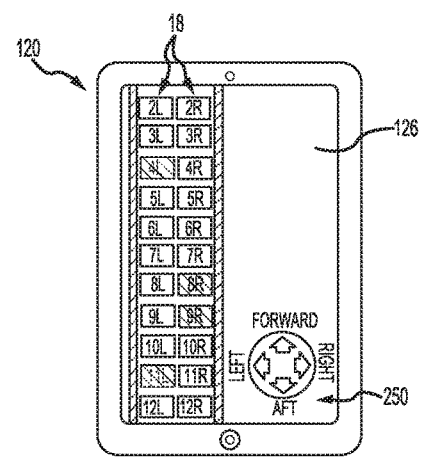

For example, and with reference to FIGS. 8A, 8B, and 8C, when viewing axis 160 is between forward left limit $F_{Left}$ and forward right limit $F_{Right}$, processor 122 will configure display 126 such that a cargo controller icon 250 is oriented with the forward direction oriented toward the top of the PED 120. As used herein, the "top of the PED" refers to the surface or edge of the PED that is oriented away from the ground (e.g., away from cargo deck 12). Processor 122 will configure display 126 such that PDUs 18 are oriented on display 126 in the same direction or orientation as they appear when viewed by the operator holding PED 120 and looking in the direction of viewing axis 160.

Returning to FIG. 7B, if processor 122 determines PED orientation (δ) is not greater than or equal to 0° and not less than forward right limit $F_{Right}$, processor 122 may determine if PED orientation (δ) is greater than or equal to forward right limit $F_{Right}$ and less than aft right limit $A_{Right}$ (e.g., 135°) (step 228). If PED orientation (δ) is greater than or equal to forward right limit $F_{Right}$ and less than aft right limit $A_{Right}$, processor 122 determines PED 120 is oriented in a right-facing direction (step 229) and orients components on display 126 to a right-facing orientation (step 240).

Figure 9A:
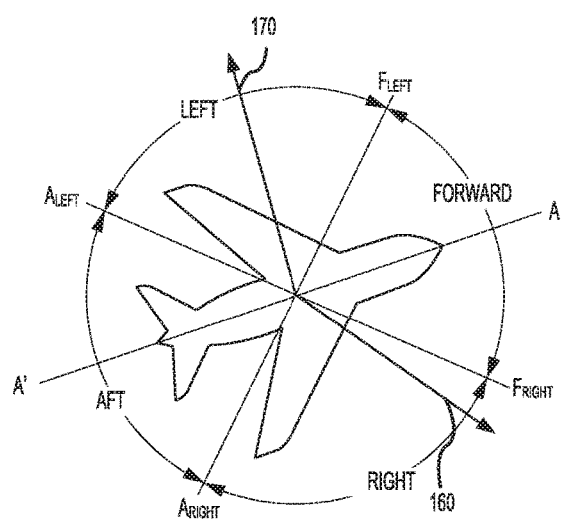
FIG. 9A illustrates a PED oriented in a right-facing direction, in accordance with various embodiments.
Figure 9B:
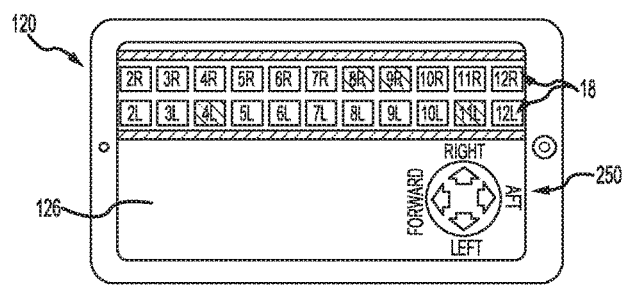
FIGS. 9B and 9C illustrate a display of a right-facing PED, in accordance with various embodiments.
Figure 9C:
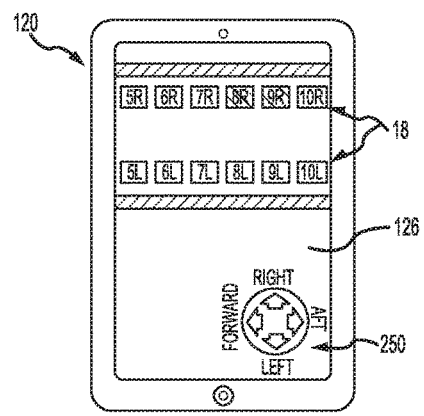

For example, and with reference to FIGS. 9A, 9B, and 9C, when viewing axis 160 is oriented between forward right limit $F_{Right}$ and aft right limit $A_{Right}$, processor 122 will configure display 126 such that cargo controller icon 250 on display 126 is oriented with the right-facing direction oriented toward the top of the PED 120. Processor 122 will further configure display 126 such that PDUs 18 are oriented on display 126 in the same direction or orientation as they appear when viewed by the operator holding PED 120 and looking in the direction of viewing axis 160 (i.e., an operator looking in the right-facing direction).

Returning to FIG. 7B, if processor 122 determines PED orientation (δ) is not greater than or equal to forward right limit $F_{Right}$ and not less than aft right limit $A_{Right}$, processor 122 may determine if PED orientation (δ) is greater than or equal to aft right limit $A_{Right}$ and less than aft left limit $A_{left}$ (e.g., 225°) (step 230). If PED orientation (δ) is greater than or equal to aft right limit $A_{Right}$ and less than aft left limit $A_{Left}$, processor 122 determines PED 120 is oriented in an aft-facing direction (step 231) and orients components on display 126 to an aft-facing orientation (step 240).

Figure 10A:
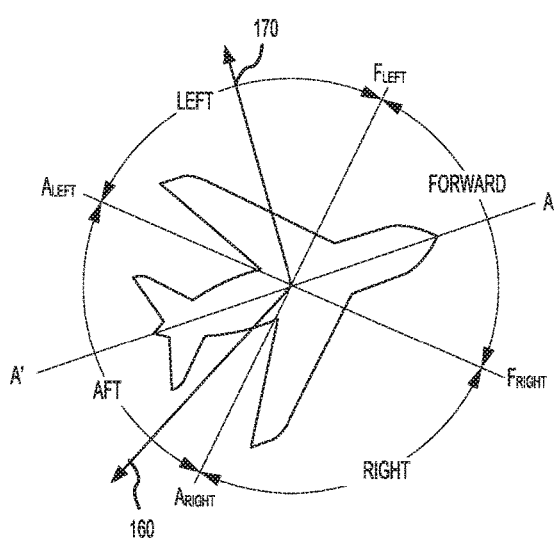
FIG. 10A illustrates a PED oriented in an aft direction, in accordance with various embodiments.
Figure 10B:
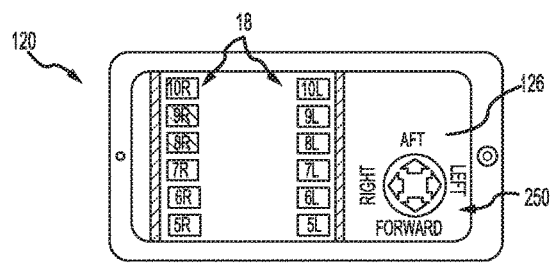
FIGS. 10B and 10C illustrate a PED display of an aft oriented PED, in accordance with various embodiments.
Figure 10C:
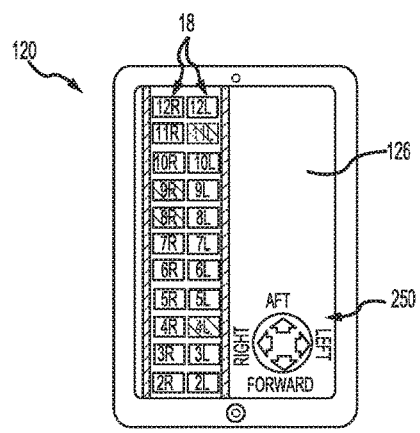

For example, and with reference to FIGS. 10A, 10B, and 10C, when viewing axis 160 is oriented between aft right limit $A_{Right}$ and aft left limit $A_{Left}$, processor 122 will configure display 126 such that cargo controller icon 250 on display 126 is oriented with the aft-facing direction oriented toward the top of the PED 120. Processor 122 will further configure display 126 such that PDUs 18 are oriented on display 126 in the same direction or orientation as they appear when viewed by the operator holding PED 120 and looking in the direction of viewing axis 160 (i.e., an operator looking in the aft-facing direction).

Returning to FIG. 7B, if processor 122 determines PED orientation (δ) is not greater than or equal to aft right limit $A_{Right}$ and not less than aft left limit $A_{Left}$, processor 122 determines that PED 120 is oriented in a left-facing direction (step 232) (i.e., processor 122 determines that PED orientation (δ) is greater than or equal to aft left limit $A_{left}$ and less than forward right limit $F_{Left}$). Upon determining that PED 120 is oriented in a left-facing direction, processor 122 orients the cargo system components on display 126 to a left-facing orientation (step 240).

Figure 11A:
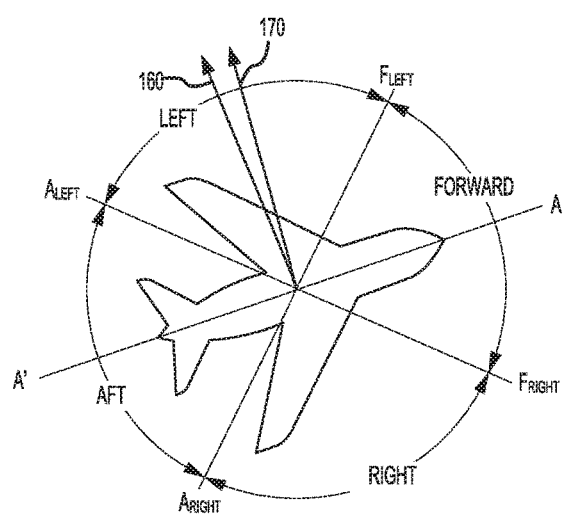
FIG. 11A illustrates a PED oriented in a left-facing direction, in accordance with various embodiments.
Figure 11B:
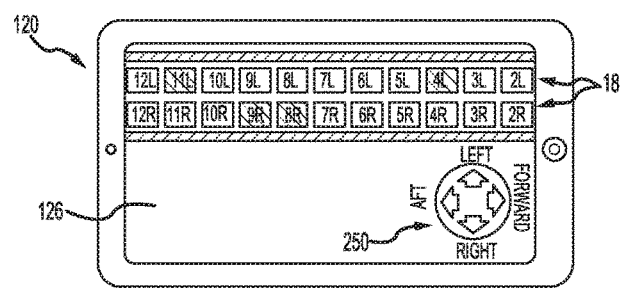
FIGS. 11B and 11C illustrate a PED display of a left-facing PED, in accordance with various embodiments.
Figure 11C:
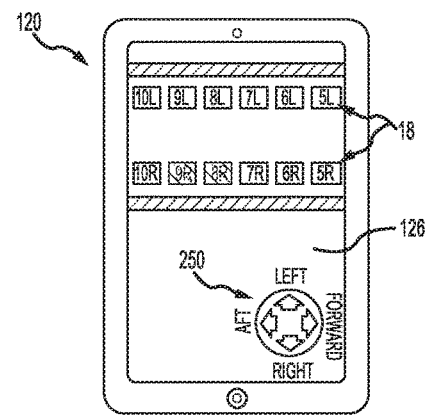

For example, and with reference to FIGS. 11A, 11B, and 11C, when viewing axis 160 is oriented between aft left limit $A_{Left}$ and forward left limit $F_{Left}$, processor 122 will configure display 126 such that cargo controller icon 250 on display 126 is oriented with the left-facing direction oriented toward the top of the PED 120. Processor 122 will further configure display 126 such that the PDUs 18 are oriented on display 126 in the same direction or orientation as they appear when viewed by the operator holding PED 120 and looking in the direction of viewing axis 160 (i.e., an operator looking in the left-facing direction).

Cargo handling system 100 with PED 120, allows the orientation of PED display 126 to be determined relative to aircraft heading, without relying on other aircraft systems. In various embodiments, using camera 128 and optical labels 140, 142 may allow the aircraft heading and display orientation to be determined in the absence of aircraft power. Auto orientation of display 126 tends to reduce operator constraints, as operators tend to be less confused due to the operator not adjusting his/her viewing direction according to a fixed display. Instead the processor 122 adjusts display 126 based on the operator's viewing direction, which may also enable the operator to focus on the actual cargo loading and unloading operation rather than focusing on the display orientation. The orientation limit angles may be configured to cater the needs of different aircrafts, for example different sized and/or different shaped cargo decks.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A handheld portable electronic device for controlling a cargo handling system, the handheld portable electronic device, comprising:
  a display;
  a camera;
  a processor in electronic communication with the camera and the display; and
  a tangible, non-transitory memory configured to communicate with the processor, the tangible, non-transitory memory having instructions stored thereon that, in response to execution by the processor, cause the processor to perform operations comprising:
    identifying, by the processor, an optical label scanned by the camera as attached to either a left aircraft wall or a right aircraft wall;
    determining, by the processor, a viewing angle of the camera relative to the optical label;
    determining, by the processor, a heading of the handheld portable electronic device relative to magnetic north;
    calculating, by the processor, an aircraft heading using the heading of the handheld portable electronic device and the viewing angle of the camera relative to the optical label;

calculating, by the processor, an orientation of the handheld portable electronic device using the aircraft heading and the heading of the handheld portable electronic device; and orienting, by the processor, an image on the display based on the orientation of the handheld portable electronic device.

2. The handheld portable electronic device of claim 1, wherein orienting, by the processor, the image on the display comprises:

comparing, by the processor, the orientation of the handheld portable electronic device to an orientation limit angle.

3. The handheld portable electronic device of claim 2, wherein orienting, by the processor, the image on the display further comprises orienting, by the processor, a location of a cargo system component on the display to coincide with the orientation of the handheld portable electronic device.

4. The handheld portable electronic device of claim 2, wherein the viewing angle of the camera relative to the optical label is measured between a viewing axis of the camera and an axis perpendicular to a scannable surface of the optical label.

5. The handheld portable electronic device of claim 1, wherein orienting, by the processor, the image on the display comprises changing, by the processor, an orientation of the image on the display in response to a change in the orientation of the handheld portable electronic device.

6. A method for orienting a display of a handheld portable electronic device configured to control a cargo handling system, comprising:

identifying, by a processor, an optical label scanned by a camera as attached to either a left aircraft wall or a right aircraft wall;

determining, by the processor, a viewing angle of the camera relative to the optical label;

determining, by the processor, a heading of the handheld portable electronic device relative to magnetic north;

calculating, by the processor, an aircraft heading using the heading of the handheld portable electronic device and the viewing angle of the camera relative to the optical label;

calculating, by the processor, an orientation of the handheld portable electronic device using the aircraft heading and the heading of the handheld portable electronic device; and orienting, by the processor, an image on the display based on the orientation of.

7. The method of claim 6, wherein orienting by the processor, the image on the display comprises:

comparing, by the processor, the orientation of the handheld portable electronic device to an orientation limit angle.

8. The method of claim 7, wherein orienting by the processor, the image on the display further comprises orienting, by the processor, a location of a cargo system component on the display to coincide with the orientation of the handheld portable electronic device.

9. The method of claim 7, wherein orienting, by the processor, the image on the display further comprises changing, by the processor, an orientation of the image on the display in response to a change in the orientation of the handheld portable electronic device.

10. The method of claim 6, wherein the viewing angle of the camera relative to the optical label is measured between a viewing axis of the camera and an axis perpendicular to a scannable surface of the optical label.

11. An article of manufacture including a tangible, non-transitory computer-readable storage medium having instructions stored thereon for orienting a display of a portable electronic device configured to control a cargo handling system, wherein the instructions, in response to execution by a processor, cause the processor to perform operations comprising:

identifying, by the processor, an optical label scanned by a camera of the portable electronic device;

determining, by the processor, a viewing angle of the camera relative to the optical label;

determining, by the processor, a heading of the portable electronic device relative to magnetic north;

calculating, by the processor, an aircraft heading using the heading of the portable electronic device and the viewing angle of the camera relative to the optical label;

calculating, by the processor, an orientation of the portable electronic device using the aircraft heading and the heading of the portable electronic device; and orienting, by the processor, an image on the display of the portable electronic device based on the orientation of the portable electronic device.

12. The article of claim 11, wherein orienting, by the processor, the image on the display comprises:

comparing, by the processor, the orientation of the portable electronic device to an orientation limit angle.

13. The article of claim 12, wherein orienting, by the processor, the image on the display further comprises orienting, by the processor, a location of a cargo system component on the display to coincide with the orientation of the portable electronic device.

14. The article of claim 11, wherein identifying the optical label scanned by the camera comprises determining, by the processor, if the optical label is a right optical label or a left optical label.

15. The article of claim 11, wherein orienting, by the processor, the image on the display comprises changing, by the processor, an orientation of the image on the display in response to a change in the orientation of the portable electronic device.

* * * * *